United States Patent [19]
Bilz et al.

[11] 3,723,017
[45] Mar. 27, 1973

[54] DRILLING CHUCK

[75] Inventors: Otto Bilz, Esslingen; Otto Fauth, Nellingen, both of Germany

[73] Assignee: Firma Otto Bilz, Nellingen, Germany

[22] Filed: Aug. 23, 1971

[21] Appl. No.: 174,050

[30] Foreign Application Priority Data

Sept. 5, 1970 Germany................P 20 44 137.6
Jan. 15, 1971 Germany................P 21 01 704.9

[52] U.S. Cl. .....................408/16, 408/6, 408/238
[51] Int. Cl. ...............................................B23b 49/00
[58] Field of Search............408/6, 16, 238, 11, 239; 10/89 H, 89 F, 129, 141 H; 81/52.4, 52.5

[56] References Cited

UNITED STATES PATENTS 2,775,137  12/1956  Chung...................................279/22
3,587,361  6/1971   Smith....................................408/16

Primary Examiner—Francis S. Husar
Attorney—Craig, Antonelli & Hill

[57] ABSTRACT

A chuck unit for a boring or similar tool which is provided with a safety clutch comprising an additional tool spindle which is axially slidable partly within and relative to the machine spindle and carries the boring tool, and clutch balls which normally engage into an annular clutch groove in the tool spindle under the action of an adjustable compression spring which is interposed between and connects the tool spindle to the machine spindle. If because of a dull boring tool the axial back pressure by the workpiece upon the tool exceeds the strength at which the clutch balls are maintained by the preadjusted compression spring in the clutch groove of the tool spindle, the latter shifts toward the rear relative to the machine spindle and thereby forces the clutch balls out of the clutch groove so that the further forward movement of the machine spindle will not be transmitted to the tool spindle and the boring tool thereon. The disengagement of the safety clutch may be visually indicated either directly on the clutch unit or at a remote point and the indication may also be used for switching off the driving means of the machine tool.

16 Claims, 5 Drawing Figures

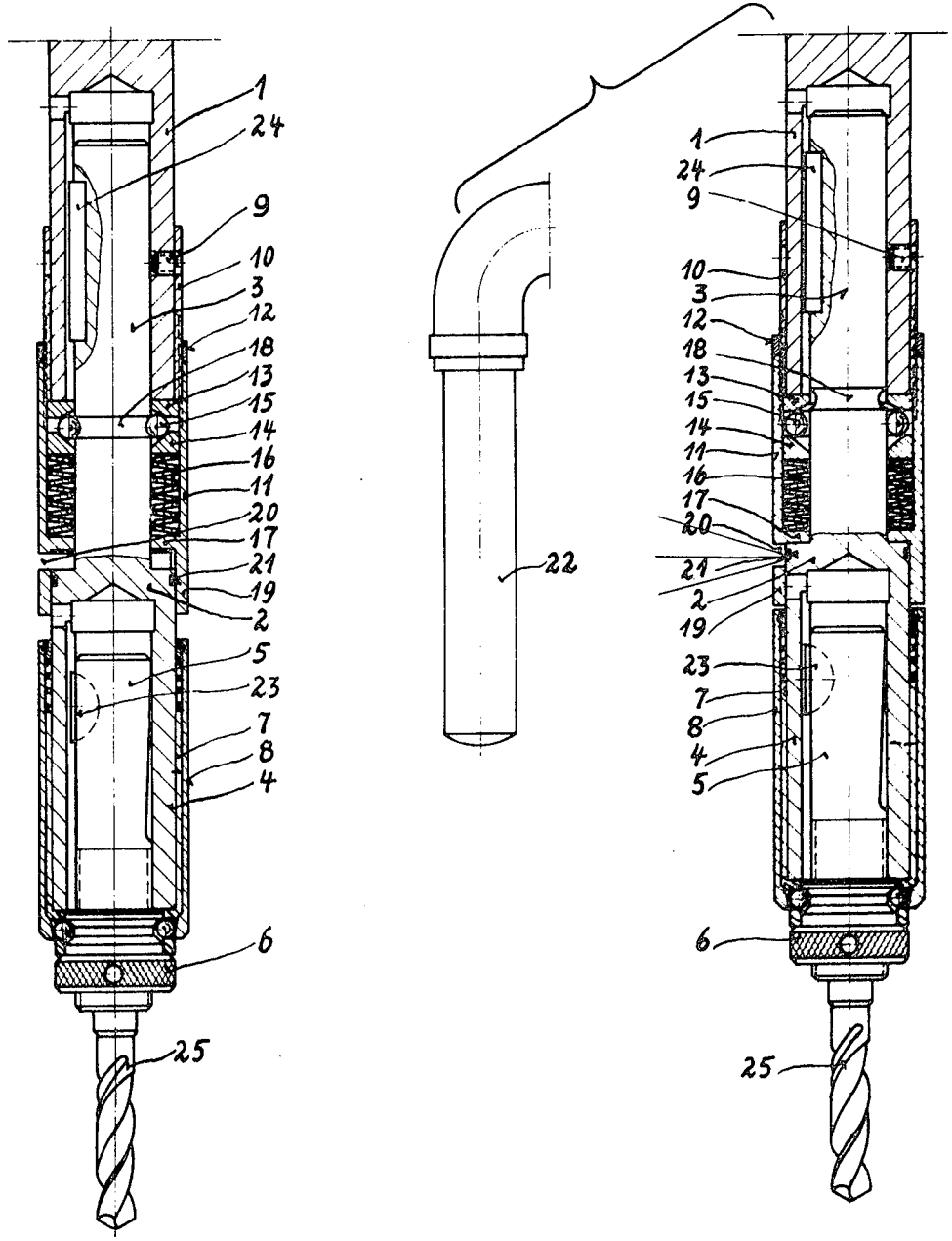

DRILLING CHUCK

The present invention relates to a drilling chuck either with or without a tool quick changing device for gripping a drill or other boring tool, and it is the principal object of the invention to provide such a chuck with a safety clutch which is infinitely adjustable and responsive to axial pressure and traction and normally connects the spindle which is driven by the machine tool to an additional tool spindle on which the tool socket or the actual quick-change chuck is mounted.

This safety clutch is adapted to disengage automatically for preventing the respective boring tool from being further moved in its axial direction and for thus preventing the tool from breaking if, for example, for some reason the axial back pressure upon the tool which is caused by its cutting resistance when drilling a bore into a workpiece increases to a value exceeding the axial feeding power of the machine spindle which has been preset in accordance with the normal cutting resistance of the tool and the back pressure thereon. Such an increased cutting resistance and axial back pressure upon the tool may occur, for example, if the boring tool is worn dull or if a smaller core bore in a workpiece which is to be enlarged to its final diameter has either not been drilled deep enough or is clogged up by a broken part of the smaller drill.

The safety clutch according to the invention is, however, not only adapted to disengage when the axial back pressure upon the boring tool exceeds a predetermined value but also when during the retraction of the machine spindle the boring tool encounters an excessive resistance to its retraction from the bore in the workpiece.

It is another object of the invention to provide the drilling chuck with means for indicating the disengagement of the safety clutch and/or for stopping the machine tool when the safety clutch is disengaged.

While prior to this invention it has already been possible to indicate the breaking of a boring or other tool on a chuck during the operation thereof and/or to stop the machine tool when such a breakage occurs, this always required separate control units which were rather complicated, volumenous and expensive and often also unreliable in operation and required too much time for their manipulation.

The chuck unit according to the invention eliminates all of these disadvantages since the additional tool spindle which is interposed between the machine spindle and the actual tool-carrying chuck or tool socket and is connected to the latter permits a reliable safety clutch to be installed within the chuck unit without substantially increasing the usual outer diameter of the machine spindle or of the drilling chuck. The entire chuck unit therefore requires very little space which is especially important if a plurality of such units is to be mounted closely adjacent to each other on the spindles of a multiple-spindle machine. The additional tool spindle and the safety clutch may also be mounted in a conventional machine spindle and may be connected either to a conventional tool socket or to a quick-change chuck. The features of the invention are also not limited to drilling chucks but may also be applied to chucks or similar means for holding other tools which are to be moved in axial directions.

The means for indicating the disengagement of the safety clutch may also be of various designs and such a disengagement may be either visually indicated by suitable means on the chuck unit itself or the indications may be transmitted to remote points and may also be employed for automatically stopping the machine tool when the disengagement occurs.

These and additional features and advantages of the present invention will become further apparent from the following detailed description thereof which is to be read with reference to the accompanying drawings, in which:

FIG. 1 shows diagrammatically and partly in section a chuck unit according to the invention which is provided with a quick-change device in a position before it carries out a boring operation, or while it carries out a normal boring operation with a sharp boring tool;

FIG. 2 shows a similar view of the same chuck unit in a position while attempting to carry out a drilling operation with a dull boring tool;

FIG. 4 shows another similar view of the chuck unit according to FIG. 3 in the position when boring a hole with a proper boring tool; while

Figure 3:
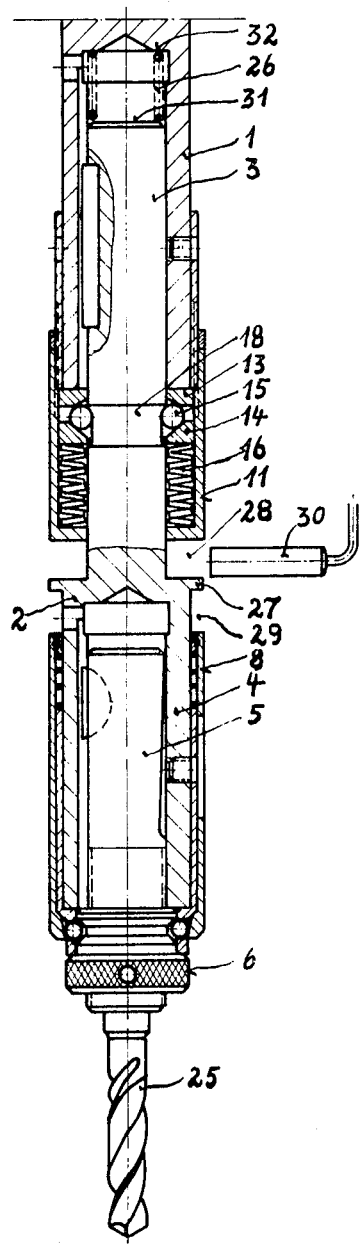
FIG. 3 shows another similar view of a chuck unit according to a modification of the invention in its position before carrying out a boring operation.

Referring first particularly to FIGS. 1 and 2 of the drawings, the spindle 1 of a machine tool is of a conventional construction and has a tubular front end into which the reduced rear part 3 of a tool spindle 2 is inserted. The hollow cylindrical front part 4 of this tool spindle 2 has an outer diameter which is larger than that of the part 3 and is substantially equal to the outer diameter of the machine spindle 1. This front part 4 of tool spindle 2 contains an adjusting sleeve 5 of a quick-change drilling adapter or, if the chuck is not provided with a quick-changing device, it contains a socket for holding a drill or other boring tool 25.

The adjusting sleeve 5 forms a part of a conventional quick-change chuck which additionally compresses an adjusting nut 6, a bushing 7 containing locking balls, and a control or guide sleeve 8 which is acted upon by a spring. The adjusting sleeve 5 is driven by the tool spindle 2 by being nonrotatably connected thereto by a spline 23, while tool spindle 2 is, in turn, nonrotatably connected to the machine spindle 1 by a spline 24.

The safety clutch according to the invention comprises the following elements: A tube 10 which is slipped over the tubular front part of the machine spindle 1 so that its front end is flush with the front end of spindle 1 and is secured to spindle 1 by a screw 9. This sleeve 10 is further provided with an outer screw thread upon which the rear end of an adjusting sleeve 11 is adjustably screwed which may be secured in the adjusted position by a threaded locking ring 12. Since the walls of sleeves 10 and 11 only have to have a small thickness, their outer diameters and thus the maximum diameter of the entire chuck unit only need to be slightly larger than the outer diameter of the machine spindle 1.

The adjusting sleeve 11 has a front end 19 extending beyond the bottom of the axial bore of the front part 4 of tool spindle 2, and adjacent to and behind this front end 19 sleeve 11 is provided with an annular flange 17 which projects inwardly to a diameter which is substantially equal to the diameter of the reduced part 3 of tool spindle 2.

This flange 17 forms the support of the front end of a compression spring 16, for example, a set of cup springs which is inserted into the annular chamber which is defined by the reduced part 3 of spindle 2 and the adjusting sleeve 11. The rear end of the set of cup springs 16 engages upon a pressure ring 14 which is axially spaced from and slidable relative to a second pressure ring 13 which abuts against the front end surface of the machine spindle 1. The inner end surfaces of the two pressure rings 13 and 14 which face each other are conically tapered and form the bearing surfaces of a set of clutch balls 15 which due to the pressure of cup springs 16, normally project into an annular clutch groove 18 in the outer wall surface of the reduced part 3 of spindle 2. These clutch balls 15 and the wall of the clutch groove 18 form associated clutch members which together with the pressure rings 13 and 14 and cup springs 16 form the principal elements of the safety clutch according to the invention.

By turning the adjusting sleeve 11 relative to the machine spindle 1 it is possible to vary the initial pressure which is exerted by the cup springs 19 upon the pressure ring 14 and through the latter upon the clutch balls 15 to maintain the latter in the clutch groove 18 of spindle 2. The force of the cup springs 16 may thus be adjusted so as to be in accordance with the normal back pressure which during a boring operation is exerted in the axial direction upon the boring tool 25. If for any reason this back pressure exceeds the force with while the clutch balls 15 are maintained by the cup springs 16 in groove 18, tool spindle 2 will be shifted toward the rear relative to the machine spindle 1 and will thereby force the balls 15 out of groove 18 and radially outwards along the tapered surfaces of rings 13 and 14. As illustrated in FIG. 2, balls 15 will thereby wedge apart the pressure rings 13 and 14 against the action of cup springs 16, so that the balls can pass fully between the two pressure rings and will roll along the outer surface of the reduced part 3 of spindle 2. The safety clutch between the two spindles 1 and 2 is thus disengaged and the continued forward movement of spindle 1 will not be transmitted to spindle 2 and the boring tool 25, but the reduced part 3 of spindle 2 will slide more deeply into the axial bore in spindle 1.

The initial rate of compression of cup springs 16 as determined by the adjustment of the adjusting sleeve 11 also determines the possibility of retracting the boring tool 25 from a bore in a workpiece. If spindle 1 is retracted with a greater force or at a higher speed than that at which boring tool 25 can be withdrawn from the bore in the workpiece, the clutch balls 25 will likewise be pulled out of the clutch groove 18 of spindle 2 and roll along the outer surface of its part 3 so that this spindle and tool 25 will not be further retracted.

When the adjusting sleeve 11 is sufficiently turned to release the set of cup springs 16, the reduced part 3 of tool spindle 2 may be easily pulled out of the machine spindle 1 if this tool spindle is to be exchanged for another.

The front end 19 of the adjusting sleeve 11 normally covers an indicating ring 21 which is applied upon the rear end of the thicker part 4 of tool spindle 2 or is inserted into an annular groove in this part. Intermediate the front end 19 and flange 17 of sleeve 11, the latter is provided with a viewing slot 20 which is produced, for example, by milling it within a plane extending at a right angle to an axial plane of spindle 2. If this spindle 2 moves toward the rear relative to spindle 1 because the back pressure upon the tool 25 on spindle 2 is too great or if spindle 1 is retracted at a higher speed than that at which tool 25 can be retracted from the bore in the workpiece, the indicating ring 21 will pass into the area of slot 20 and may be seen through this slot from the outside. This will visually indicate the actuation of the safety clutch according to the invention. Of course, if desired, it is also possible to provide the viewing slot 20 in such a position that the indicating ring 21 will be normally visible and only be covered when the safety clutch is disengaged.

It is of particular advantage if the indicating ring 21 consists of a radioactive material which is adapted to act upon a Geiger tube 22 which is mounted in a fixed position at the outside of spindle 1 and is connected to an indicating device. The operation of each drill spindle may thus be supervised even at a very remote point and, if desired, the machine tool may also be stopped automatically from this point by the indicating device. An indicating device of this kind or a plurality of such devices may also be provided for the spindles of a multiple-spindle machine, in which case a separate Geiger tube 22 may be associated with each spindle or a common Geiger tube with several spindles.

The indicating ring 21 may, however, also be of a different kind and form, for example, a colored ring or a lighted ring or a glossy reflecting ring so as to be easily seen from the outside when it appears through the slot 20. It may also be designed so as to reflect, for example, normal light rays or infrared rays which are emitted from, and are received by suitable apparatus which indicates the appearance of the reflecting ring either directly or transmits this appearance to another indicating or control device at a remote point.

Figure 4:
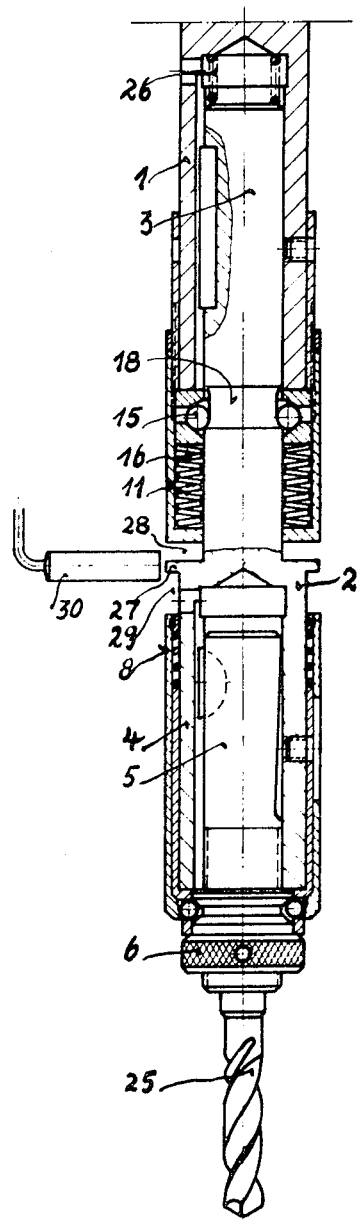
Figure 5:
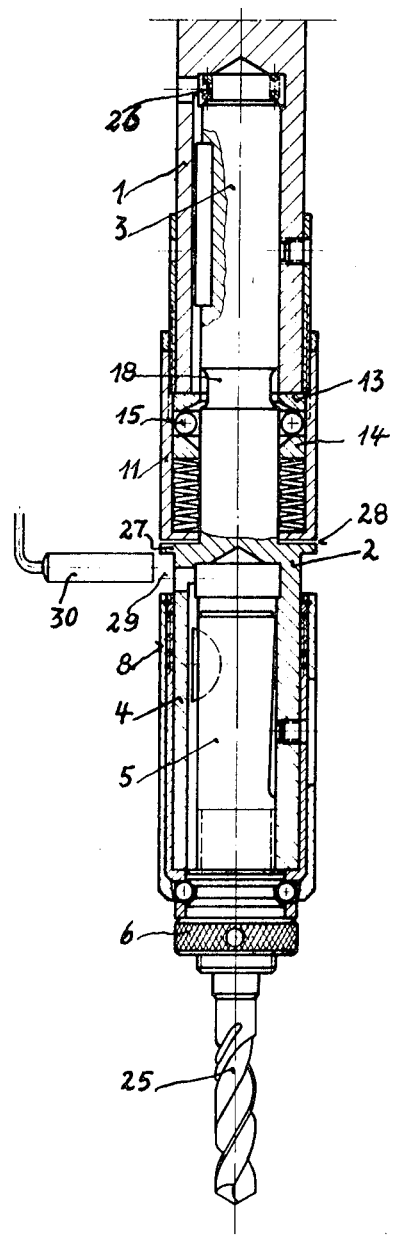
FIG. 5 shows still another similar view of the chuck unit according to FIG. 4 in its position when attempting to bore a hole with a dull boring tool.

The embodiment of the invention as illustrated in FIGS. 3 to 5 is basically similar to that as shown in FIGS. 1 to 2. It is, however, additionally provided with a compression spring 26 which is inserted between the rear end surface 31 of the part 3 of tool spindle 2 and the bottom 32 of the axial bore in the machine spindle 1. Furthermore, the annular clutch groove 18 in this part 3 of spindle 2 is made of a greater width or length in the axial direction of the spindle, and at the connection between this reduced part 3 and the thicker outer part 4 an outwardly projecting control flange 27 is provided the outer diameter of which corresponds to the outer diameter of the adjusting sleeve 11.

Before a boring operation is started and no back pressure is as yet exerted upon the end of the boring tool 25, the chuck unit is in the position as shown in FIG. 3, in which the tool spindle 2 is shifted forwardly by the compression spring 26 until the clutch balls 15 abut against the rear end of the enlarged clutch groove 18 so that a wide gap 28 is formed between the control flange 27 and the front end of the adjusting sleeve 11.

At one side of this gap 28, an electronic switch 30 is mounted which is of a conventional type and extends transverse to the axis of spindles 1 and 2. Such a switch may consist, for example, of an oscillator which is operated at a high frequency and the oscillations of which are damped when a metallic part moves to its vicinity and thereby acts accordingly upon an output transistor. Such switches are frequently used especially for a non-contact control and supervision of the operation of various kinds of machines. When the tool spindle 2 is in the position as illustrated in FIG. 3, gap 28 is located directly in front of the electronic switch 30 and this switch is therefore not actuated.

When in the normal operation of the chuck according to FIGS. 3 to 5 a hole is being drilled into a workpiece with a proper boring tool 25, the cutting pressure of this tool results in a back pressure upon the tool spindle 2 in the longitudinal direction toward the rear thereof. For taking up this normal back pressure, the compression spring 26 which is inserted between the rear end of the tool spindle part 3 and the bottom 32 of the axial bore in the machine spindle 1 is made of such dimensions as to allow the tool spindle then to move back to the position as illustrated in FIG. 4, in which the clutch balls 15 abut against the front end of the clutch groove 18 and the control flange 27 is moved into the area in front of switch 30. Therefore, in a normal boring operation with a proper boring tool 25, switch 30 will be actuated. The circuit of the driving means of the machine tool to which switch 30 is connected is designed so that in this case of a normal boring operation the driving means will continue to operate when switch 30 is energized by being acted upon by the control flange 27.

If, however, the boring tool 25 is or becomes dull, the back pressure which is then exerted upon tool 25 and tool spindle 2 increases so that this spindle will move back against the action of the preadjusted cup springs 16 to the position as shown in FIG. 5, in which it also further compresses the compression spring 26. Control flange 27 is then moved back to a position in which it no longer acts upon the switch 30 which is then located opposite to the gap 29 between flange 27 and the rear end of the control sleeve 8. The circuit of the driving means of the machine tool and of the electronic switch 30 is designed so that, if the boring tool 25 is dull or worn off and the tool spindle 2 is moved to the position as shown in FIG. 5, switch 30 will switch off the driving means of the machine spindle 1 so that the latter will be stopped.

By providing the chuck unit with an electronic switch 30, a compression spring 26, an enlarged clutch groove 18 in tool spindle 2 and a control flange 27 it is therefore possible to control the operation of the chuck unit so that, unless the boring tool 25 is properly sharpened, the machine tool on which spindle 1 is mounted will be switched off.

Although our invention has been illustrated and described with reference to the preferred embodiments thereof, we wish to have it understood that it is in no way limited to the details of such embodiments but is capable of numerous modifications within the scope of the appended claims.

Having thus fully disclosed our invention, what we claim is:

1. A chuck unit comprising a machine spindle adapted to be mounted on, and to be reciprocated in its axial direction by a machine tool, a tool spindle, means for guiding said tool spindle on said machine spindle so as to be slidable coaxially relative thereto, means on said tool spindle for mounting a tool thereon, a safety clutch having first and second clutch members adapted in one position to interengage with each other to connect said tool spindle to said machine spindle when said tool is in a proper condition when pressed in its axial direction against a workpiece, said clutch members adapted to disengage from each other when said tool is in an improper condition when pressed in its axial direction against a workpiece, and adjusting means for infinitely varying the strength of engagement between said clutch members so as normally to be in accordance with the axial back pressure exerted upon the free end of said proper tool by its engagement with said workpiece.

2. A chuck unit as defined in claim 1, in which said safety clutch is designed so that said clutch members will disengage from each other not only when said tool is in an improper condition when moved by said spindles against said workpiece, but also when said machine spindle is retracted at a certain speed from said workpiece but said tool on said tool spindle cannot be retracted at the same speed from said workpiece.

3. A chuck unit as defined in claim 2, in which at least the front end of said machine spindle is tubular by having an axial bore and said tool spindle comprises two shank parts, one of said shank parts being thicker than the other and having an outer diameter substantially equal to the outer diameter of said machine spindle and having one end carrying said tool mounting means, and the other thinner shank part having an outer diameter substantially equal to the diameter of said bore in said machine spindle and being axially slidable within said bore.

4. A chuck unit as defined in claim 3, in which said safety clutch further comprises spring means acting upon said first clutch member for normally maintaining it in locking engagement with said second clutch member, said adjusting means being adapted to vary the effective strength of said spring means and the pressure exerted thereby upon said first clutch member.

5. A chuck unit as defined in claim 4, in which said adjusting means comprise an externally threaded first sleeve slipped over the end of said machine spindle, means for removably securing said first sleeve to said machine spindle, an adjusting sleeve having an internally threaded rear part adapted to be screwed over and axially along said first sleeve for varying the effective strength of said spring means, and a locking ring adapted to be screwed upon said first sleeve and against one end of said adjusting sleeve for maintaining it in its adjusted position.

6. A chuck unit as defined in claim 5, in which said adjusting sleeve has an internally smooth front part axially slidable over the rear end of said thicker shank part of said tool spindle and an annular internally projecting flange intermediate its front and rear parts and projecting toward said smaller shank part and its inner surface being axially slidable along said smaller shank part, the rear surface of said flange supporting the front end of said spring means.

7. A chuck unit as defined in claim 6, in which the front end surface of said tubular part of said machine spindle, the rear surface of said flange and the intermediate part of the wall of said adjusting sleeve together define a chamber around said thinner shank part of said tool spindle, a pair of pressure rings one behind the other in said chamber and having beveled surfaces at one side facing each other and also facing said thinner shank part, the rear side of the first of said rings being connected to said front surface of said tubular part, said tool spindle having an annular groove the wall of which forms one of said clutch members, the other clutch member consisting of a plurality of balls disposed between said pressure rings, said spring means also being disposed in said chamber and the other end of said spring means engaging upon the front side of the second of said pressure rings, said spring means being normally adapted to press said pressure rings toward each other to such an extent as to press said balls into said groove and thus to interengage said clutch members with each other when said adjusting sleeve is adjusted to compress said spring means so as to maintain said balls in said groove as long as said back pressure upon said tool does not exceed the force with which said spring means maintain parts of said balls in said groove, said tool spindle automatically ejecting said balls radially from said groove and forcing them entirely between said pressure rings when said back pressure exceeds said force or when said tool cannot be retracted at the same speed at which said machine spindle is retracted.

8. A chuck unit as defined in claim 7, in which, when said spring means are sufficiently released by said adjusting ring, said tool spindle may be easily withdrawn entirely from said machine spindle.

9. A chuck unit as defined in claim 1, further comprising indicating means for indicating the operative positions of said clutch members relative to each other.

10. A chuck unit as defined in claim 6, in which the wall of said adjusting sleeve is provided with an aperture in its front end in front of said flange, and indicating means comprising an indicating member on said larger shank part adapted to be visible through said aperture so as to indicate the operative positions of said clutch members relative to each other when said tool spindle is appropriately shifted relative to said adjusting sleeve.

11. A chuck unit as defined in claim 10, in which said indicating means further comprise an indicating instrument including a Geiger tube mounted laterally at one side of and spaced from said adjusting sleeve, said indicating member containing a radioactive material adapted to act upon said Geiger tube through said aperture.

12. A chuck unit as defined in claim 10, in which said indicating member is adapted to emit light rays through said aperture.

13. A chuck unit as defined in claim 10, in which said indicating member is adapted to reflect light rays through said aperture.

14. A chuck unit as defined in claim 7, in which said annular groove has front and rear end walls spaced from each other at a distance greater than required for radially receiving the parts of said balls normally projecting into said groove so that said balls are movable in said groove in the axial direction of said tool spindle between said front and rear walls, and further comprising a compression spring inserted into said tubular part of said machine spindle and having one end acting upon the bottom of said tubular part and another end acting upon the rear end surface of said tool spindle so that, when said balls project into said groove, said tool spindle is axially slidable for said distance relative to said balls against the action of said compression spring.

15. A chuck unit as defined in claim 14, in which said internally smooth front part of said adjusting sleeve is omitted and said flange forms the front end of said adjusting sleeve, and further comprising indicating means for indicating the operative positions of said clutch members relative to each other, said indicating means comprising an annular outer flange on the rear end of said larger shank part of said tool spindle and having an outer diameter substantially equal to the outer diameter of said adjusting sleeve, said tool spindle when no axial back pressure is exerted upon said tool being maintained by said compression spring in a position in which said balls engage upon said rear wall of said groove so that an annular gap is formed between said inner flange and said outer flange, said indicating means further comprising an electronic switch mounted in a fixed position so that its free end is disposed opposite to and outside of said gap, said switch being actuated when a back pressure is exerted upon said tool so that said tool spindle is shifted toward the rear against the action of said compression spring until said balls engage upon said front wall of said groove and said outer flange is thereby moved to a position opposite to and in front of said free end of said switch.

16. A chuck unit as defined in claim 15, further comprising another annular member on said tool spindle in front of said outer flange and spaced by a second gap therefrom, said switch being again actuated when said back pressure upon said tool becomes excessive and said balls are forced out of said annular groove and said outer flange is moved so far toward the rear that said free end of said switch is disposed opposite to said second gap.

* * * * *